United States Patent
Okamoto

(10) Patent No.: US 10,057,495 B2
(45) Date of Patent: Aug. 21, 2018

(54) DISPLAY DEVICE, IMAGE DISPLAY METHOD AND STORAGE MEDIUM

(71) Applicant: CASIO COMPUTER CO., LTD., Shibuya-ku (JP)

(72) Inventor: Naoya Okamoto, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 78 days.

(21) Appl. No.: 15/017,259

(22) Filed: Feb. 5, 2016

(65) Prior Publication Data
US 2016/0261802 A1 Sep. 8, 2016

(30) Foreign Application Priority Data
Mar. 4, 2015 (JP) .................. 2015-042674

(51) Int. Cl.
*H04N 5/232* (2006.01)

(52) U.S. Cl.
CPC ..... *H04N 5/23293* (2013.01); *H04N 5/23203* (2013.01)

(58) Field of Classification Search
None
See application file for complete search history.

(56) References Cited

U.S. PATENT DOCUMENTS

| | | | |
|---|---|---|---|
| 7,298,409 B1* | 11/2007 | Misawa | H04N 1/0044 348/333.01 |
| 2006/0061663 A1* | 3/2006 | Park | H04N 5/23293 348/211.2 |
| 2011/0109771 A1* | 5/2011 | Onomura | G03B 13/10 348/240.3 |
| 2013/0141640 A1* | 6/2013 | Kim | H04N 5/2254 348/375 |
| 2014/0132781 A1* | 5/2014 | Adams | H04N 5/2254 348/207.1 |
| 2014/0152777 A1* | 6/2014 | Galor | H04N 5/2254 348/47 |
| 2014/0253693 A1* | 9/2014 | Shikata | H04N 1/2112 348/47 |
| 2014/0267803 A1* | 9/2014 | Shintani | H04N 5/23293 348/208.2 |
| 2015/0022694 A1* | 1/2015 | Jogetsu | H04N 5/23209 348/240.1 |
| 2015/0049204 A1 | 2/2015 | Okabe et al. | |
| 2015/0237249 A1* | 8/2015 | Sato | H04N 5/23203 348/207.11 |

(Continued)

FOREIGN PATENT DOCUMENTS

JP 5541429 7/2014

*Primary Examiner* — Timothy J Henn
(74) *Attorney, Agent, or Firm* — Cozen O'Connor

(57) ABSTRACT

In a display device including a camera section and a monitor, imaging range information indicating an imaging range for the imaging device is acquired. Subsequently, a display target area corresponding to the imaging range indicated by the imaging range information is set in an image captured by the camera section. Then, a partial image in the display target area in the image captured by the camera section is displayed on the monitor. As a result, live view display can be achieved without causing the imaging device to capture a photographic subject at a predetermined frame rate and transmit the captured image.

12 Claims, 6 Drawing Sheets

(56) References Cited

U.S. PATENT DOCUMENTS

| | | | |
|---|---|---|---|
| 2015/0256759 A1* | 9/2015 | Yoshino | H04N 5/23212 |
| | | | 348/240.1 |
| 2016/0191812 A1* | 6/2016 | Tsubusaki | H04N 5/23296 |
| | | | 348/240.1 |
| 2016/0269514 A1* | 9/2016 | Ito | H04M 1/0256 |

* cited by examiner

DISPLAY DEVICE, IMAGE DISPLAY METHOD AND STORAGE MEDIUM

CROSS-REFERENCE TO RELATED APPLICATION

This application is based upon and claims the benefit of priority from the prior Japanese Patent Application No. 2015-042674, filed Mar. 4, 2015, the entire contents of which are incorporated herein by reference.

BACKGROUND OF THE INVENTION

1. Field of the Invention

The present invention relates to a display device, an image display method, and a storage medium for displaying a captured image.

2. Description of the Related Art

Conventionally, there are a number of unit type imaging devices that are constituted mainly by an imaging lens and an image sensor without having a monitor for image display and supplies an acquired image to an external display device.

Japanese Patent No. 5541429 discloses a technology of causing an image acquired (captured) by an imaging device to be wirelessly transmitted to a display device such as a portable telephone to achieve live view display by the display device, and also causing an imaging operation to be performed by the imaging device through an operation from the display device and an acquired image to be stored in the imaging device or the display device.

SUMMARY OF THE INVENTION

In accordance with one aspect of the present invention, there is provided a display device comprising: an imaging section; a display section; an acquiring section which acquires imaging range information indicating an imaging range for an external imaging device; a setting section which sets, in an image captured by the imaging section, an area corresponding to the imaging range indicated by the imaging range information acquired by the acquiring section; and a first display control section which controls an image corresponding to the area set by the setting section to be displayed on the display section.

In accordance with another aspect of the present invention, there is provided a display method comprising: an acquiring step of acquiring imaging range information indicating an imaging range for an external imaging device; a setting step of setting, in an image captured by an imaging section, an area corresponding to the imaging range indicated by the imaging range information acquired in the acquiring step; and a display control step of controlling an image in the area set in the setting step to be displayed on a display section.

In accordance with another aspect of the present invention, there is provided a non-transitory computer-readable storage medium having stored thereon a program that is executable by a computer in a display device having an imaging section and a display section, the program being executable by the computer to actualize functions comprising: acquisition processing for acquiring imaging range information indicating an imaging range for an external imaging device; setting processing for setting, in an image captured by the imaging section, an area corresponding to the imaging range indicated by the imaging range information acquired in the acquisition processing; and display control processing for controlling an image corresponding to the area set in the setting processing to be displayed on the display section.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENT

Figure 1A:
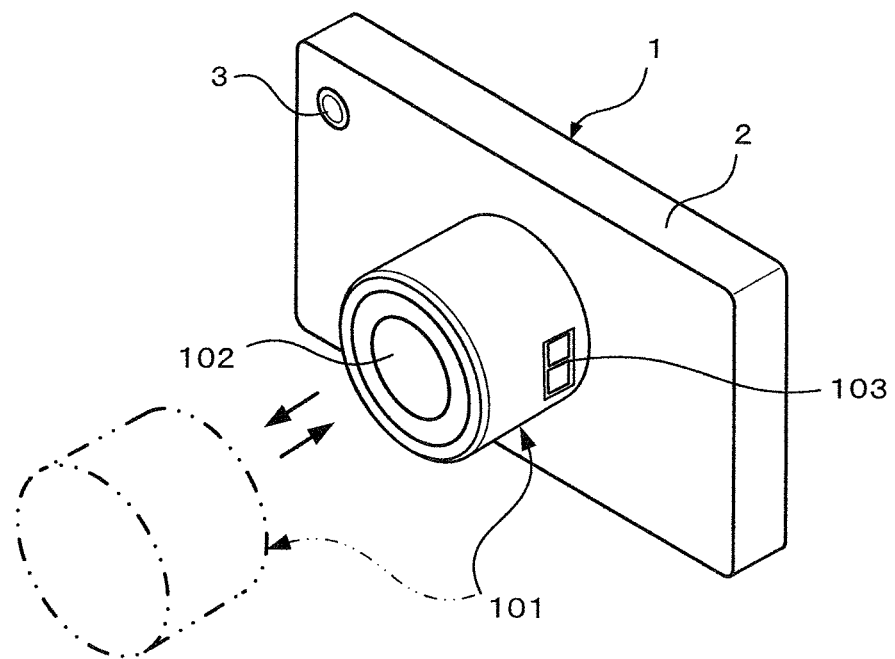
FIG. 1A is a diagram of a display device according to an embodiment of the present invention, which shows a perspective view of the outer appearance on the back surface side to which a unit-type imaging device is attached.
Figure 1B:
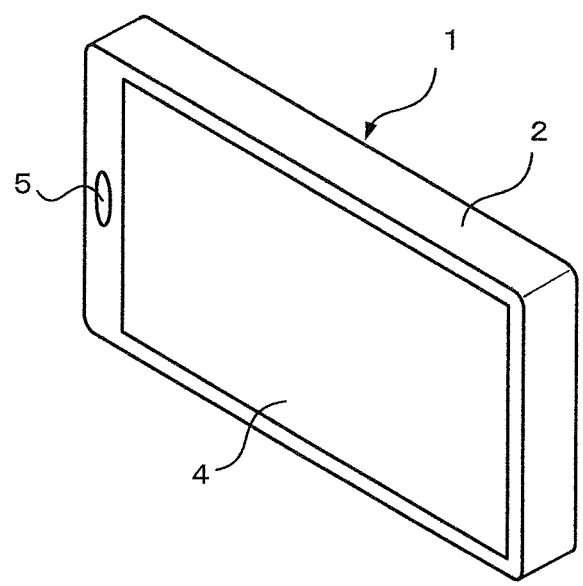
FIG. 1B is a diagram of the display device according to the embodiment of the present invention, which shows a perspective view of the outer appearance on the front surface side of the display device.

Hereinafter, an embodiment of the present invention will be described. FIG. 1A is a diagram of a display device 1 according to the present invention, which shows a perspective view of the outer appearance on the back surface side to which a unit-type imaging device 101 is attached. Also, FIG. 1B is a perspective view of the outer appearance of the display device 1 on the front surface side.

Specifically, the display device 1 of the present embodiment is actualized by a smart phone generally available as a portable information terminal. This display device 1 has a thin-plate-shaped main body 2. On the back surface side of the main body 2, a camera section 3 is provided, as depicted in FIG. 1A. On the front surface side of the main body 2, a monitor 4 including a touch panel and a loudspeaker 5 for conversation are provided, as depicted in FIG. 1B.

The imaging device 101 is removably attached to the display device 1. For example, the imaging device 101 is attached to a substantially center portion of the main body 2 of the display device 1 by using a dedicated or general-purpose attachment (not depicted in the drawings), and positioned away from the camera section 3, as depicted in FIG. 1A. This imaging device 101 mainly includes an imaging lens 102, an image sensor described later, and an operating section 103 constituted by a plurality of operation switches such as a power supply switch and a shutter button.

Figure 2:
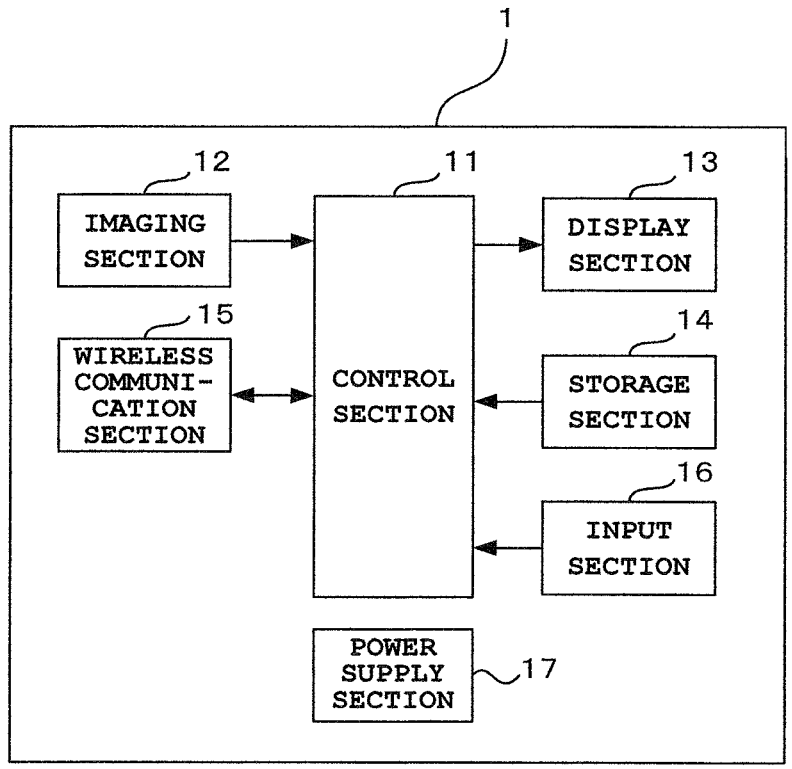
FIG. 2 is a block diagram showing the electrical structure of the display device and the imaging device.
Figure 2:
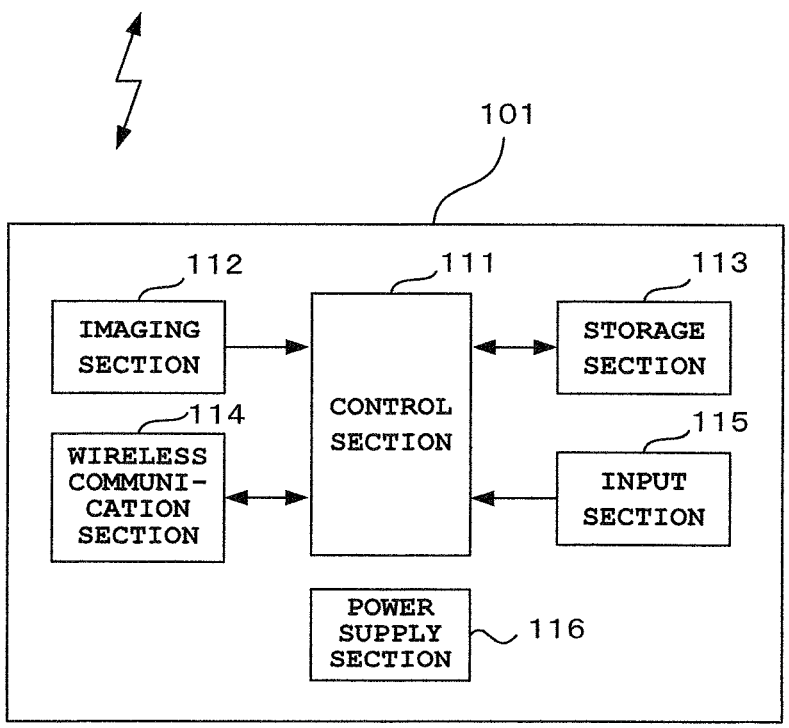

FIG. 2 is a block diagram depicting main sections in the electrical structure of the display device 1 and the imaging device 101.

First, the electrical structure of the display device 1 is described. The display device 1 includes a control section 11, an imaging section 12, a display section 13, a storage section 14, a wireless communication section 15, an input section 16, and a power supply section 17, as depicted in the drawing.

The control section 11 is constituted by a CPU (Central Processing Unit), its peripheral circuits, a ROM (Read Only Memory) having a program stored thereon, a work RAM (Random Access Memory), and the like not depicted in the drawing. This control section 11 controls each section of the display device 1 by following the program stored in the ROM and various application (software) programs stored in the storage section 14, and also performs various processing described later.

The imaging section 12 is constituted by an image sensor such as a CCD (Charge Coupled Device) or CMOS (Complementary Metal Oxide Semiconductor) for imaging a photographic subject via an imaging lens provided in the camera section 3, a drive circuit for the image sensor, an AFE (Analog Front End), and the like. This imaging section 12 amplifies an imaging signal outputted from the image sensor when the display device 1 is in a camera mode, converts it to a digital signal, and supplies it to the control section 11.

When the display device 1 is functioning as a camera, the imaging signal supplied from the imaging section 12 to the control section 11 is subjected to a plurality of stages of signal processing in the control section 11, supplied to the display section 13 constituted by the monitor 4 and its drive circuit, and displayed as a live view image on the monitor 4. In image capturing, image data to be recorded is generated by the control section 11 based on the imaging signal supplied from the imaging section 12, compressed in a JPEG (Joint Photographic Expert Group) format or the like, and then stored in the storage section 14.

The storage section 14 is a built-in semiconductor memory such as a flash memory, and stores a basic control program for use by the control section 11 in controlling each section of the display device 1, the above-described application programs for achieving various functions by the display device 1, image data compressed by the control section 11, that is, data of captured images, and the like. The application programs include a predetermined application program allowing image capturing of the imaging device 101 by the operation of the display device 1 (hereinafter referred as a remote-control application).

The wireless communication section 15, for example, is constituted by a communication circuit for performing short-distance wireless communication with the imaging device 101, receiving image data from the imaging device 101, and transmitting an operation signal to the imaging device 101, as will be described later. Note that, in the present embodiment, the short-distance wireless communication by the wireless communication section 15 is based on Bluetooth (registered trademark).

The input section 16 is constituted by a power supply switch and the touch panel added to the monitor 4.

The power supply section 17 is constituted by a power supply battery (for example, a rechargeable battery such as a nickel metal hydride battery), a DC/DC converter, and the like, and supplies each section of the display device 1 with electric power required therefor.

The display device 1 includes, for telephone communication, a microphone, a voice input circuit and transmission circuit for modulating and transmitting voice inputted from the microphone, a reception circuit for receiving a voice signal for decoding and reproduction, a reproduction circuit including the loudspeaker 5, and the like. However, drawings and descriptions of these known circuits are omitted herein.

Next, the electrical structure of the imaging device 101 is described. This imaging device 101 includes a control section 111, an imaging section 112, a storage section 113, a wireless communication section 114, an input section 115, and a power supply section 116, as depicted in FIG. 2.

The control section 111 is constituted by a CPU, its peripheral circuits, a ROM having a program stored therein, a work RAM, and the like not depicted in the drawing. The control section 111 controls each section of the imaging device 101 by following the program stored in the ROM, and also performs various processing described later.

The imaging section 112 is constituted by an image sensor such as a CCD or CMOS for imaging a photographic subject via the imaging lens 102, a drive circuit of the image sensor, an AFE, and the like. The imaging section 112 amplifies an imaging signal outputted from the image sensor, converts it to a digital signal, and supplies it to the control section 111.

The control section 111 performs a plurality of stages of signal processing on the imaging signal supplied from the imaging section 112 to generate image data and, in an imaging standby state, supplies the image data to the display device 1 via the wireless communication section 114. Also, in image capturing, the control section 111 generates image data to be recorded, compresses it in a JPEG format or the like, and stores it in the storage section 14 as a still image file.

The storage section 113 is constituted by a built-in semiconductor memory such as a flash memory, a card-type memory attachable to and detachable from the imaging device 101, or the like.

The wireless communication section 114, for example, is constituted by a communication circuit for performing short-distance wireless communication with the display device 1, transmitting image data generated by the control section 111 to the display device 1, and receiving an operation signal transmitted from the display device 1.

The input section 115 is constituted by a plurality of operation switches such as the power supply switch in the operating section 103.

The power supply section 116 is constituted by a power supply battery (for example, a rechargeable battery such as a nickel metal hydride battery), a DC/DC converter, and the like, and supplies each section of the imaging device 101 with electric power required therefor.

In the display device 1 of the present embodiment, by the user starting the remote-control application by operating the touch panel or the like, image capturing of the imaging device 101 is performed by the operation of the display device 1.

Hereafter, the operation of the display device 1 when the remote-control application is activated is described. Note that, here, the operation is described based on an assumption that pairing in Bluetooth (registered trademark) between the display device 1 and the imaging device 101 has been performed and that image capturing by the imaging device 101 is still image capturing.

Figure 3:
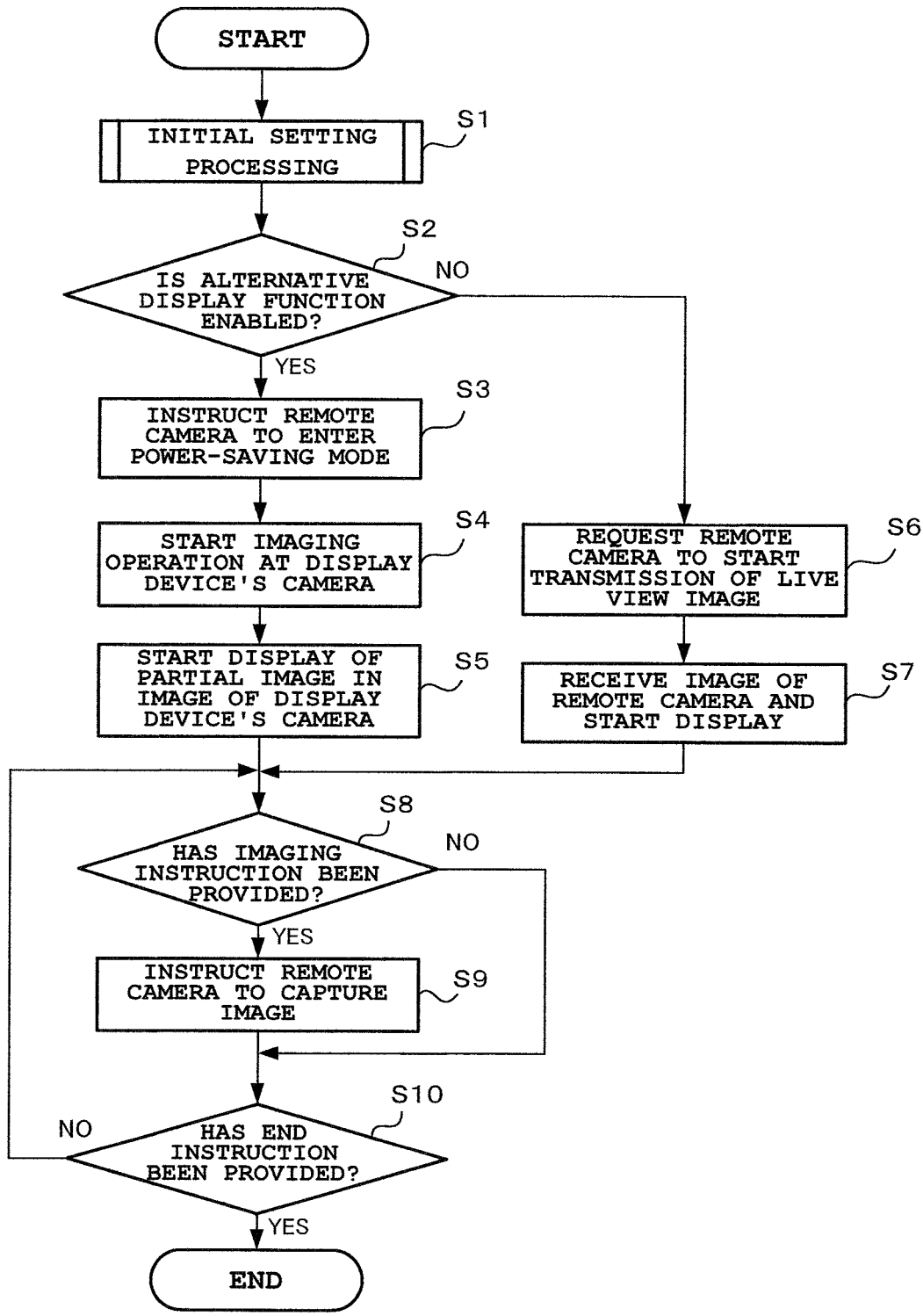
FIG. 3 is a flowchart of operations of the display device according to the present invention.
Figure 4:
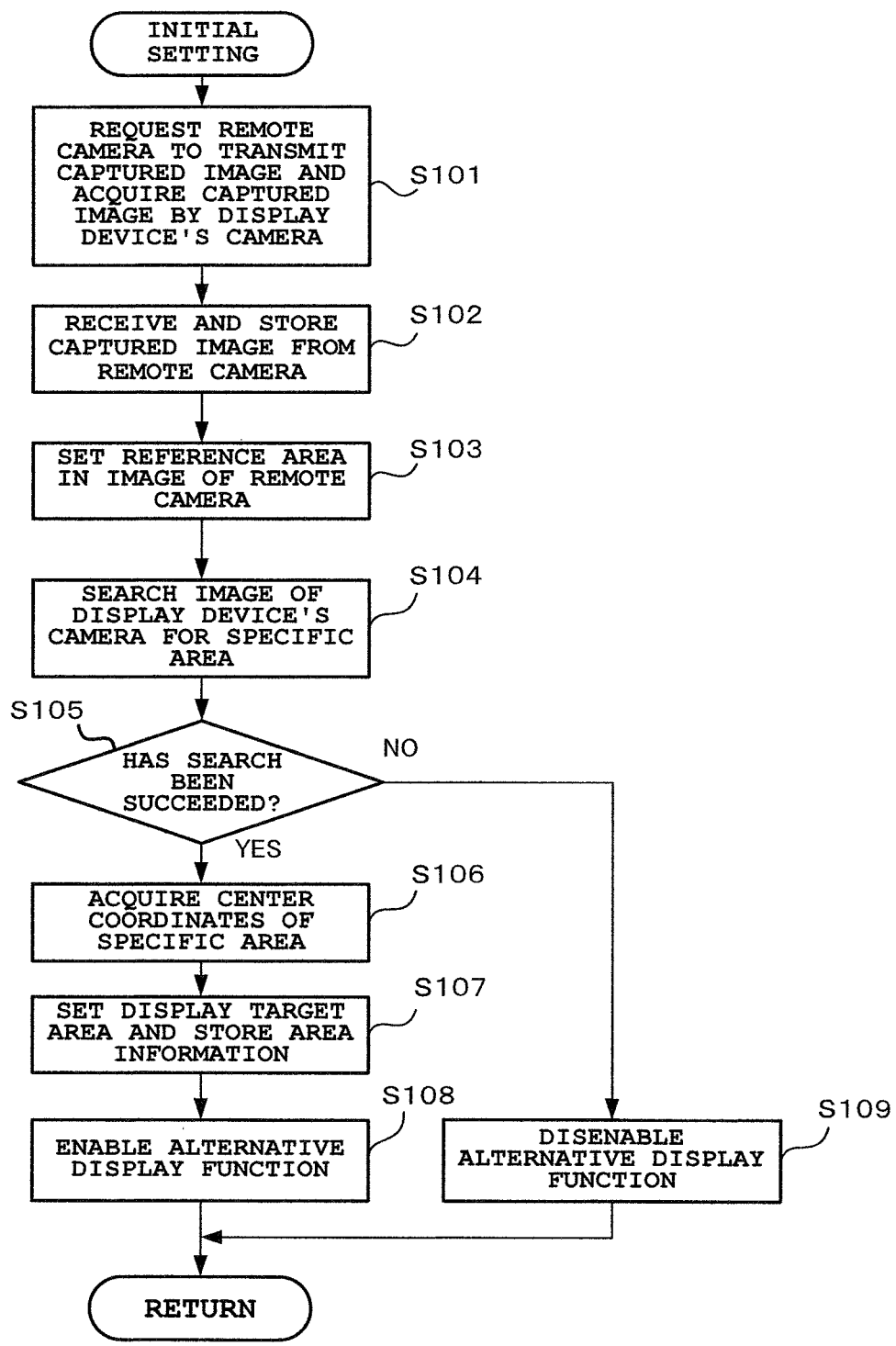
FIG. 4 is a flowchart of initial setting processing of FIG. 3.

FIG. 3 and FIG. 4 are flowcharts of processing to be performed by the control section 11 of the display device 1 when the remote-control application is started.

When the remote-control application is started, the control section 11 immediately performs initial setting processing depicted in FIG. 4 (Step S1), as depicted in FIG. 3. Note that, in the following descriptions of this processing, the imaging device 101 is referred to as a remote camera, and the camera section 3 included in the display device 1 is referred to as a display device's camera.

In the initial setting processing, the control section 11 requests the remote camera (imaging device 101) to transmit a captured image, and acquires the captured image by the display device's camera (Step S101), as depicted in FIG. 4. More specifically, the control section 11 transmits a request signal to the remote camera to request the image capturing of a photographic subject and the transmission of a captured image. Concurrently, the control section 11 causes the imaging section 12 to capture the photographic subject, acquires a captured image, and stores it in the work RAM.

The control section 11 then receives the captured image sent from the remote camera in response to the request, and stores the captured image in the work RAM as imaging range information indicating an imaging range for the remote camera (Step S102).

Figure 5:
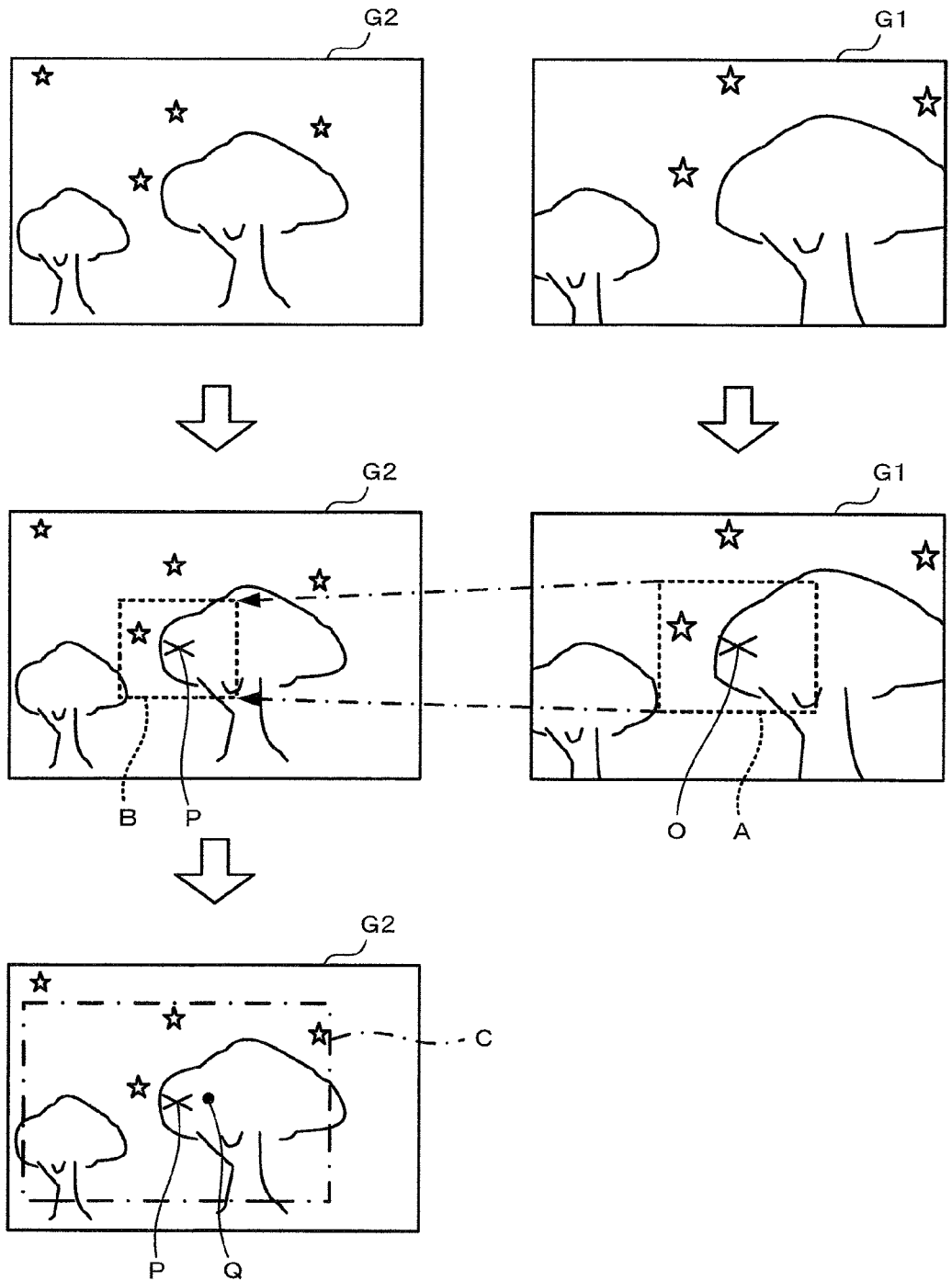
FIG. 5 is a diagram of a relation between a first captured image and a second captured image.

FIG. 5 is a diagram of a relation between a captured image (hereinafter referred to as a first captured image) G1 of the remote camera and a captured image (hereinafter referred to as a second captured image) G2 of the display device's camera which have been acquired at substantially same timing by the processing described above. Note that the present embodiment is based on an assumption that the viewing angle of the display device's camera is wider than the viewing angle of the remote camera, as depicted in the drawing.

Subsequently, the control section 11 sets reference area A in the first captured image G1 (Step S103). This reference area A is a peripheral area of the center O of the first captured image G1, and is an area having pixel sizes in longitudinal and lateral directions defined in advance.

Next, the control section 11 searches the second captured image G2 acquired by the display device's camera for specific area B corresponding to reference area A as depicted in FIG. 5 by using a known image processing technology (Step S104). When searching for specific area B, for example, the control section 11 sequentially sets target areas in the second captured image G2 while changing the size of a partial image of reference area A, and compares the partial image and the target image regarding the outline, color, and the like of the photographic subject. Then, when both images match, the control section 11 takes the target area as specific area B.

Next, when the searching operation for specific area B has been successfully completed, that is, when specific area B is present in the second captured image G2 as exemplarily depicted in FIG. 5 and the control section 11 judges that the imaging device 101 has been attached as depicted in FIG. 1A (YES at Step S105), the control section 11 acquires a coordinate position of the center O of specific area B in the second captured image G2 (Step S106).

Moreover, the control section 11 sets display target area C based on the coordinate position of the center O of acquired specific area B and the size (or reduction ratio) of reference area A at the time of the search operation for specific area B, and stores area information indicating the position and size of display target area C in the image (Step S107). That is, the control section 11 sets the first captured image G1, that is, an area corresponding to the imaging range of the remote camera in the entire area of the second captured image G2, as display target area C, and stores its area information. The area information, for example, includes coordinate positions of four corners of display target area C. FIG. 5 is a diagram showing for convenience that a shift occurs between the center P of display target area C and the center Q of the second captured image G2.

Then, the control section 11 enables an alternative display function (Step S108), ends the initial setting processing, and returns to the processing of FIG. 3. Here, the alternative display function is a function provided based on an assumption that image capturing is performed with the imaging device 101 being attached. More specifically, in this function, in place of an image acquired by the remote camera, an image acquired by the display device's camera is taken as a live view image and displayed on the monitor 4 by live view display, as will be described later.

Also, unlike the case described above, when the searching operation for the above-described specific area in the second captured image G2 has failed, that is, when the control section 11 judges that the imaging device 101 has not been attached (NO at Step S105), the control section 11 immediately disenables the alternative display function (Step S109), ends the initial setting processing, and returns to the processing of FIG. 3.

Subsequently, when the alternative display function is enabled in the initial setting processing (YES at Step S2), the control section 11 first instructs the remote camera (imaging device 101) to enter a power saving mode in a communication mode (Step S3). Here, the power-saving mode is a mode (also referred to as an idle mode or sniff mode) in which confirmation of communication with the display device 1 is performed only at predetermined time intervals. For this processing, the control section 11 transmits an instruction signal for instructing the remote camera to switch to the power saving mode in the communication mode.

Figure 6:
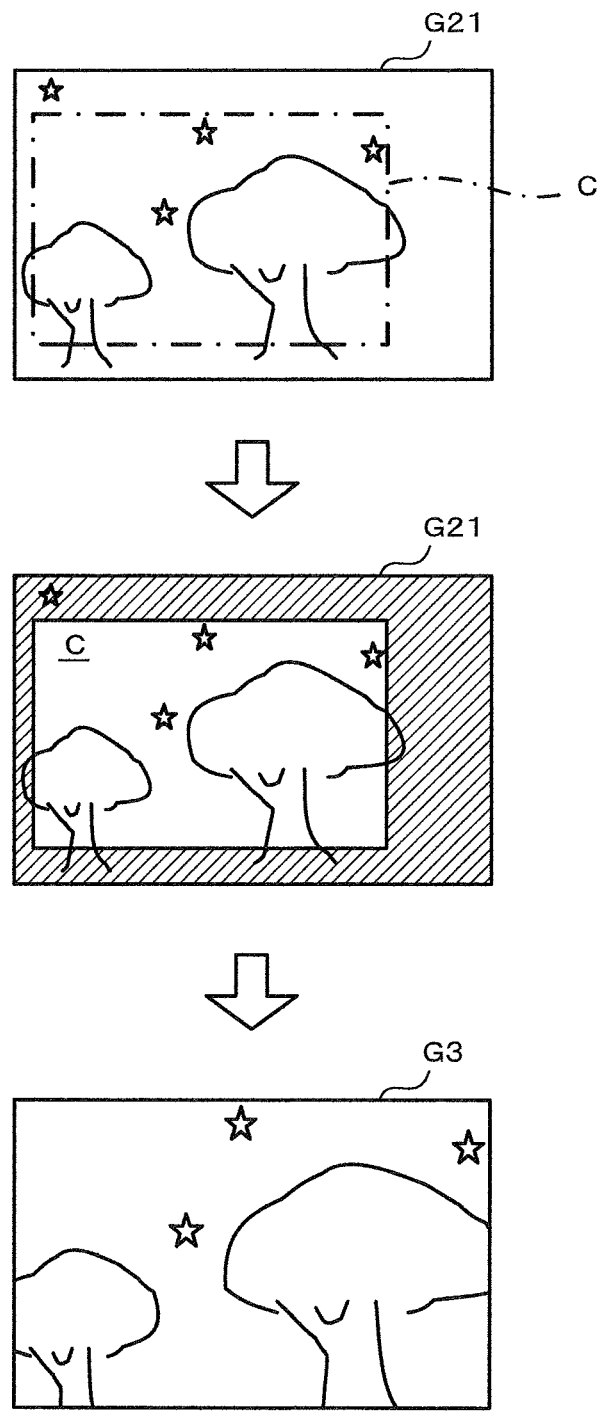
FIG. 6 is a diagram of a partial image displayed on a monitor at the time of live view display by an alternative display function.

Then, the control section 11 starts an imaging operation by the display device's camera (Step S4), and starts processing of cutting out the partial image G3 in the area indicated by the above-described area information from the captured image and causing the partial image G3 to be displayed on the monitor 4 (Step S5). That is, the control section 11 supplies image data of only display target area C of an image G21 acquired for each frame as depicted in FIG. 6 to the display section 13, cuts out the partial image G3 from the captured image, and starts live view display in which the partial image G3 is taken as a live view image and sequentially displayed on the monitor 4 by full-screen display, as depicted in FIG. 6.

On the other, unlike the above case, when the alternative display function is disenabled in the initial setting processing (NO at Step S2), the control section 11 requests the remote camera to start image capturing at a predetermined frame rate and start the transmission of a live view image (Step S6).

Then, the control section 11 starts the reception of a live view image for each frame sent from the remote camera (imaging device 101) and starts the display of the live view image on the monitor 4 (Step S7). That is, the control section 11 starts live view display where a live view image is sequentially received from the remote camera and the live view image is displayed on the monitor 4.

Then, during any one of the above-described live view display operations, that is, in an imaging standby state, the control section 11 judges whether an imaging instruction from the touch panel or the like by the user has been provided from the user and, when judged that an imaging instruction has been provided (YES at Step S8) the control section 11 transmits an instruction signal for instructing the remote camera to perform image capturing (Step S9), whereby still image capturing is performed by the remote camera.

The control section 11 continues the above-described live view display until an instruction to end the remote-control application is given from the user (NO at Step S10). During this operation, every time an imaging instruction is given from the user (YES at Step S8), the control section 11 transmits an instruction signal for instructing the remote camera to perform image capturing, and thereby causes the remote camera to perform still image capturing.

Then, when an instruction to end the remote-control application is given from the user during the live view display (YES at Step S10), the control section 11 ends the processing at that moment.

As described above, in the display device 1 of the present embodiment, when image capturing is performed by using the imaging device 101 attached to the main body 2, live view display is performed in which a part of an image captured by the imaging section 12 is displayed on the monitor 4 as a live view image. That is, live view display by the alternative display function is performed.

Accordingly, as in the cases of general digital cameras, in an imaging standby state, the user can perform image capturing while checking the composition without causing the imaging device 101 to perform image capturing of a photographic subject at a predetermined frame rate and transmit the captured image. As a result, the power consumption of the imaging device 101 in the imaging standby state can be reduced, and live view display can be achieved, or in other words, the imaging range of the imaging device 101 can be reproduced with the reduced power consumption of the imaging device 101 in image capturing.

Also, when judged that the imaging device 101 has not been attached, the control section 11 causes a live view image captured by the imaging device 101 to be displayed on the monitor 4, as with the conventional case. Therefore, the user can check the composition even when the imaging device 101 is away from the display device 1.

Moreover, only when the imaging device 101 is judged to have been attached, that is, on condition that the imaging device 101 has been attached, live view display by the alternate display function is performed. Therefore, when the imaging device 101 has not been attached, a live view image captured by the imaging section 112 of imaging device 101, that is, a normal live view image can be displayed on the monitor 4.

Furthermore, when judged that the imaging device 101 has not been attached, the control section 11 causes the imaging device 101 to automatically start an imaging operation at a predetermined frame rate. Therefore, live view display by the alternative display function can be performed without causing the user to perform burdensome operations such as directly operating the imaging device 101.

Still further, whether the imaging device 101 has been attached is judged (confirmed) based on whether specific area B corresponding to reference area A of the first captured image G1 captured by the imaging device 101 has been found in the second captured image G2 captured by the imaging section 12, and the alternative display function is automatically enabled or disenabled based on this judgment. Therefore, live view display can be performed always by an appropriate method without causing the user to perform burdensome operations.

Note that, in the implementation of the present invention, a configuration may be adopted in which, unlike the present embodiment, the display device 1 is provided with a switch that mechanically or electrically detects the attachment of the imaging device 101 to the display device 1, and whether the imaging device 101 has been attached is confirmed by the switch. Also, in the implementation of the present invention, a structure may be adopted in which the alternative display function is enabled or disenabled by the user as required.

Also, in the present embodiment, display target area C where the partial image G3 is cut out from an image captured for live view display by the alternative display function is specified based on the first captured image G1 captured at substantially same timing as the second captured image G2. Therefore, display target area C can be correctly set, for example, even when the imaging device 101 is attached to the main body 2 of the display device 1 using a general-purpose attachment.

That is, display target area C can be correctly set even if a difference in shift amount, shift direction, and optical axis direction between the imaging optical axis of the attached imaging device 101 and the imaging optical axis of the camera section 3 in the display device 1 are unknown. Also, display target area C can be correctly set even if the imaging lens 102 of the imaging device 101 is structured to have a zoom function.

Moreover, for setting display target area C, an area to be taken as display target area C is specified by searching the second captured image G2 for specific area B corresponding to reference area A defined in advance which is a part of the first captured image G1. Therefore, for example, compared with a case where the second captured image G2 is searched for an area relevant to the entire area of the first captured image G1 to specify an area to be taken as display target area C, the processing of setting display target area C can be performed at high speed.

Here, in the present embodiment, the first captured image G1 captured by the imaging device 101 is used as imaging range information indicating an imaging range of the imaging device 101. However, this imaging range information may be any information as long as it allows display target area C to be set. Therefore, as long as the imaging device 101 is a specific device that is attached to the main body 2 of the display device 1 by using a dedicated attachment, the imaging range information may be a difference in shift amount, shift direction, optical axis direction, and the like between the imaging optical axis of the attached imaging device 101 and the imaging optical axis of the camera section 3 in the display device 1.

Also, in the present embodiment, the viewing angle of the imaging device 101 and the viewing angle of the camera section 3 in the display device 1 are fixed. However, the present invention can be applied as long as a viewing angle wider than the viewing angle of the imaging device 101 can be set to the camera section 3 prior to live view display by the alternative display function.

Moreover, in the present embodiment, the imaging device 101 performs an imaging operation for the purpose of setting the above-described display target area C, and the first captured image G1 that serves as imaging range information is acquired from the imaging device 101. However, the present embodiment is not limited thereto, and a configuration may be adopted in which images for use as imaging range information are live view images acquired while the imaging device 101 is performing image capturing at a predetermined frame rate and sequentially transmitted to the display device 1.

In this configuration, for example, immediately after the remote-control application is started, the display device 1 causes the imaging device 101 to perform image capturing at the predetermined frame rate and sequentially transmit captured live view images. Then, based on a reception interval of the live view images, the display device 1 performs an imaging operation in synchronization with an imaging operation of the imaging device 101 to acquire a captured image, and a live view image captured by the imaging device 101 in the same period of time with the captured image is used as the above-described imaging range information.

Furthermore, in the present embodiment, image capturing using the imaging device 101 is mainly still image capturing. However, the present invention is not limited to still image capturing and can be applied to moving-image capturing. Still further, in the present embodiment, the display device of the present invention is achieved by a smartphone. However, the present invention is not limited thereto, and can be achieved by any electronic device as long as it includes imaging means and display means which displays a live view image captured by the imaging means.

While the present invention has been described with reference to the preferred embodiments, it is intended that the invention be not limited by any of the details of the description therein but includes all the embodiments which fall within the scope of the appended claims.

What is claimed is:

1. A display device comprising:
an imaging section;
a display section; an acquiring section which acquires imaging range information indicating an imaging range for an external imaging device;
a setting section which sets, in an image captured by the imaging section, an area corresponding to the imaging range indicated by the imaging range information acquired by the acquiring section; and
a first display control section which controls an image corresponding to the area set by the setting section to be displayed on the display section.

2. The display device according to claim 1, further comprising:
a communication section which performs communication with the external imaging device,
wherein the acquiring section acquires the imaging range information from the external imaging device via the communication section.

3. The display device according to claim 2, wherein the communication section sequentially receives, from the external imaging device, images captured by the external imaging device, and
wherein the first display control section controls the images sequentially received by the communication section to be displayed on the display section.

4. The display device according to claim 3, wherein the external imaging device is structured to be removably attached to a device main body.

5. The display device according to claim 4, further comprising:
a confirming section which confirms whether the external imaging device has been attached to the device main body,
wherein the first display control section controls images sequentially received by the communication section to be displayed on the display section on condition that the confirming section has confirmed that the external imaging device has not been attached to the device main body.

6. The display device according to claim 5, further comprising:
a requesting section which requests the external imaging device via the communication section to start imaging operations that are performed at predetermined time intervals and start transmission of images captured by the imaging operations, in response to confirmation by the confirming section that the external imaging device has not been attached to the device main body.

7. The display device according to claim 5, wherein the confirming section judges that the external imaging device has been attached when the imaging range indicated by the imaging range information acquired by the acquiring section is included in an imaging range of the image captured by the imaging section.

8. The display device according to claim 2, wherein the acquiring section requests the external imaging device via the communication section to perform an imaging operation and transmission of an image captured by the imaging operation, and acquires the image transmitted from the external imaging device as the imaging range information in response to the request.

9. The display device according to claim 2, wherein the setting section specifies an area corresponding to a first image acquired as the imaging range information by the acquiring section, based on contents of a second image captured by the imaging section at same or substantially same timing with the first image, and sets the specified area as the set area.

10. The display device according to claim 9, wherein the setting section specifies the area corresponding to the first image in the second image by searching the second image for a specific area corresponding to a reference area defined in advance in the first image, and sets the specified area as the set area.

11. An image display method of a display device comprising:
an acquiring step of acquiring imaging range information indicating an imaging range for an external imaging device external to the display device;
a setting step of setting, in an image captured by an imaging section, an area corresponding to the imaging range indicated by the imaging range information acquired in the acquiring step; and
a display control step of controlling an image in the area set in the setting step to be displayed on a display section.

12. A non-transitory computer-readable storage medium having stored thereon a program that is executable by a computer in a display device having an imaging section and a display section, the program being executable by the computer to actualize functions comprising:
acquisition processing for acquiring imaging range information indicating an imaging range for an external imaging device external to the display device;
setting processing for setting, in an image captured by the imaging section, an area corresponding to the imaging range indicated by the imaging range information acquired in the acquisition processing; and
display control processing for controlling an image corresponding to the area set in the setting processing to be displayed on the display section.

* * * * *